No. 775,535. PATENTED NOV. 22, 1904.
A. E. W. MEISSNER.
SYSTEM OF ALTERNATING CURRENT DISTRIBUTION.
APPLICATION FILED JUNE 16, 1899.
NO MODEL. 4 SHEETS—SHEET 3.
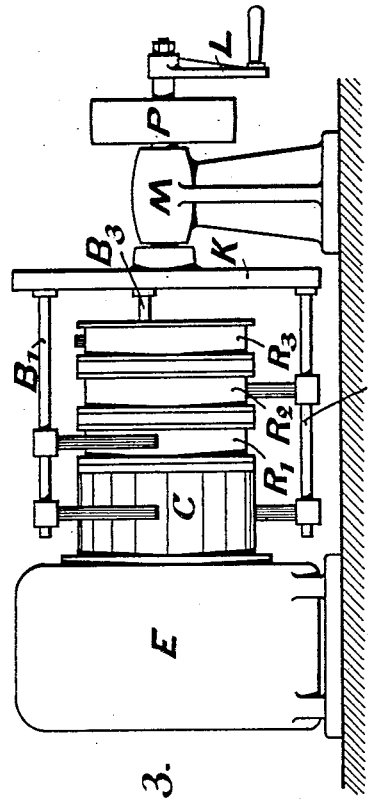
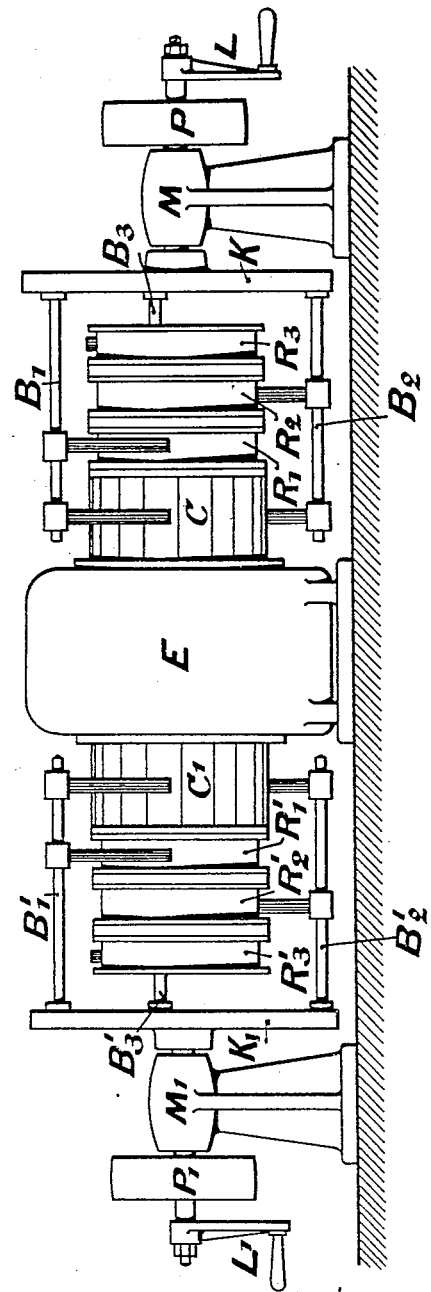

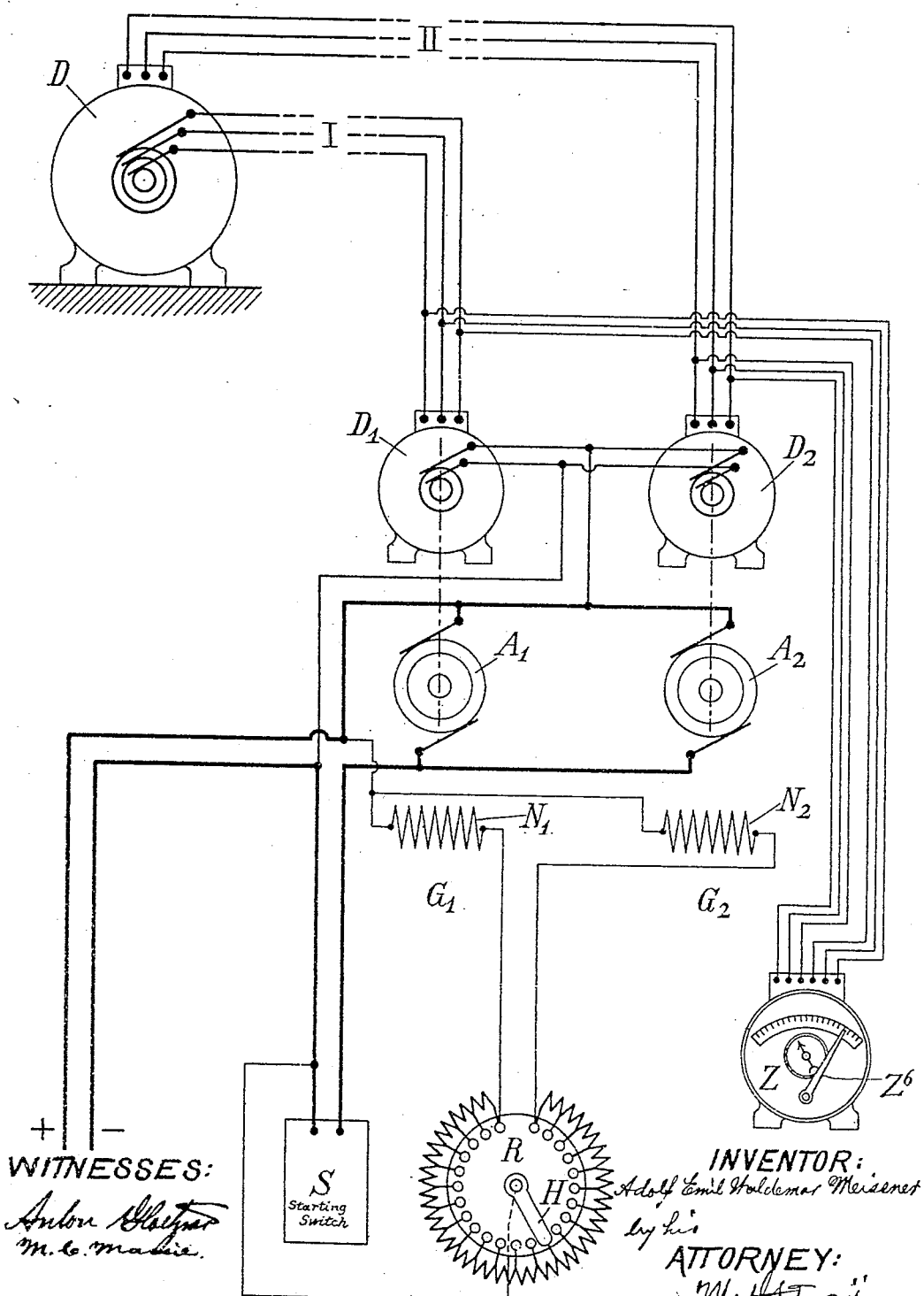

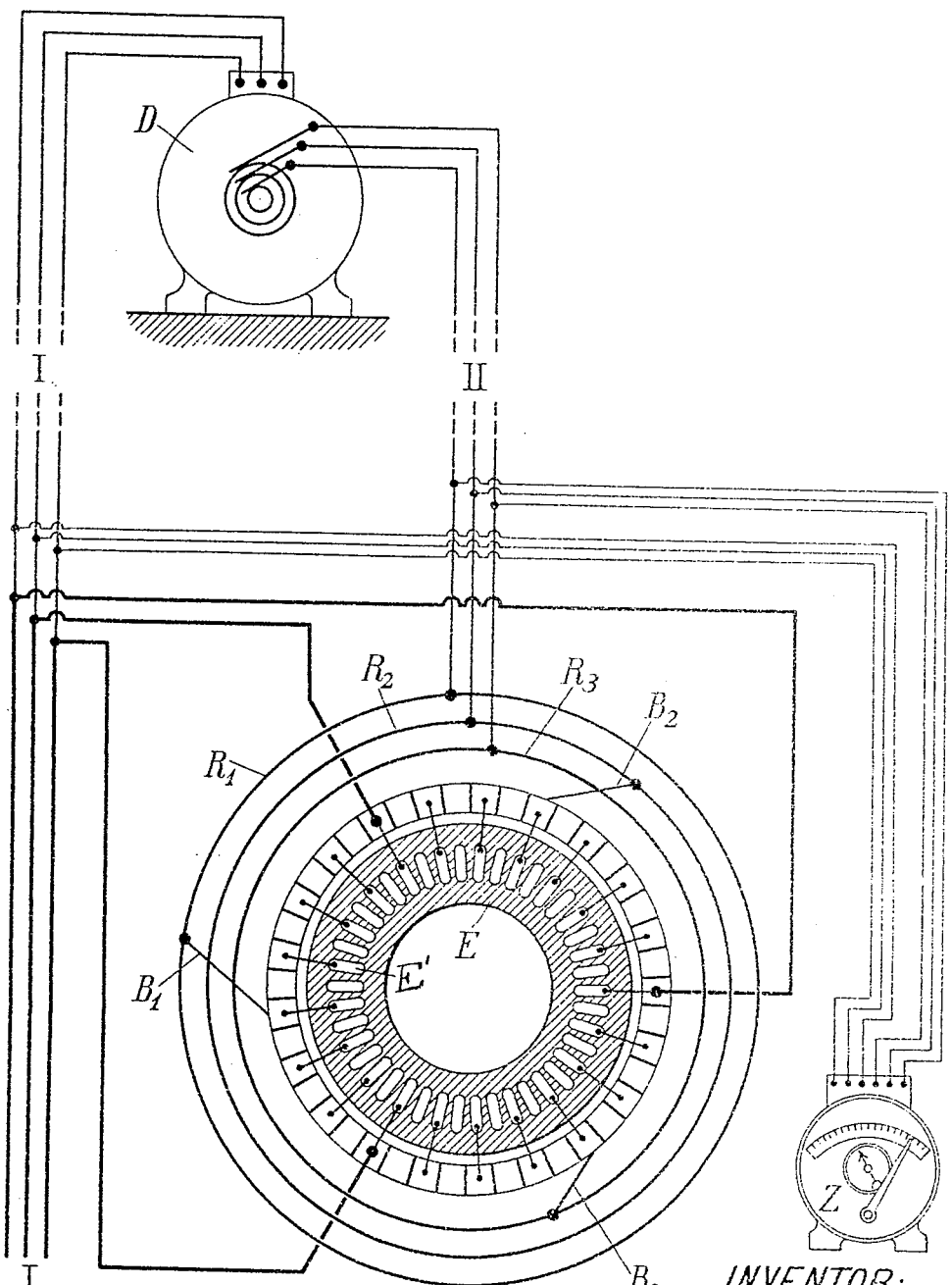

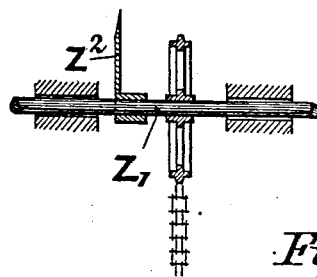
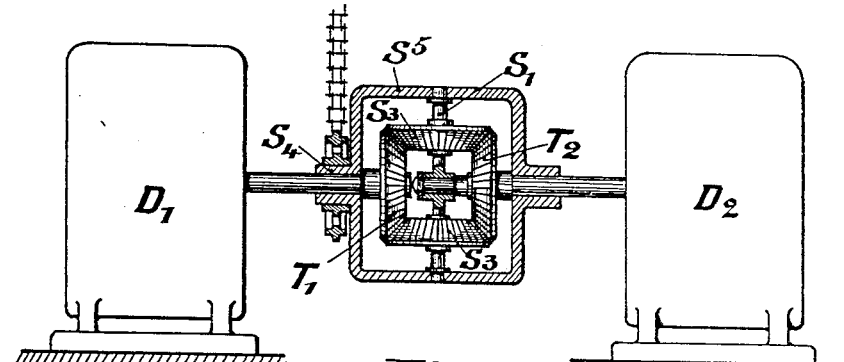
Fig. 5.
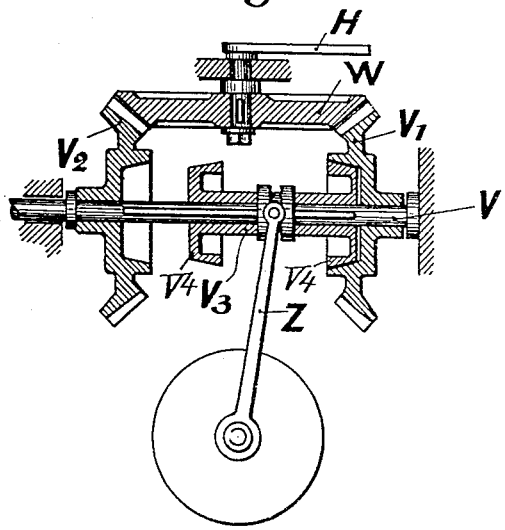
Fig. 6.

No. 775,535.

Patented November 22, 1904.

UNITED STATES PATENT OFFICE.

ADOLF EMIL WALDEMAR MEISSNER, OF CHARLOTTENBURG, GERMANY.

SYSTEM OF ALTERNATING-CURRENT DISTRIBUTION.

SPECIFICATION forming part of Letters Patent No. 775,535, dated November 22, 1904.

Application filed June 16, 1899. Serial No. 720,840. (No model.)

*To all whom it may concern:*

Be it known that I, ADOLF EMIL WALDEMAR MEISSNER, a subject of the Emperor of Germany, residing at Charlottenburg, Germany, have invented a certain new and useful Improvement in Systems of Alternating-Current Distribution; and I do hereby declare the following to be a full, clear, and exact description of the invention, such as will enable others skilled in the art to which it appertains to make and use the same.

In those cases of electrical transmission of power where the secondary driven motor (the receiver) reverses its motion frequently—as, for example, in hoisting apparatus and in operating at a distance by electricity the steering-gear of large vessels—it is an ordinary practice to cut out the circuit and soon after to put it in again with every reversal of motion, and generally auxiliary means independent of the power transmission are employed to put the necessary brake on the receiver during its temporary arrest of motion.

The present invention has for its object to accomplish in such cases, by means of the organs of the power transmission themselves, the rotating of the receiver in one direction as well as its retention in the desired position of rest and its rotation in the opposite direction (by a gradual change of direction) and at the same time to make it possible to continually observe and regulate the motion of the receiver at the primary station, (sender's point.) The movement of the receiving-machine can in this way be positive as well as negative—*i. e.*, the receiving-machine can either be driven or held back by the power transmission.

The system employed to accomplish the object hereinbefore described is marked by the following features.

The work is done at the receiver's station by a multiphase motor in which a multiphase current is conveyed to each of its two parts, which are supplied with multiphase-current windings of an optional but equal number of poles, and, furthermore, contrivances are made which make it possible to change at the sender's point the number of periods of the two multiphase currents in relation to one another. The connections of the motor must be arranged so that the two magnetic fields generated singly by each of the two currents will rotate in the same direction. If this direction be called positive, the number of revolutions of the rotating part of the motor will always be equal to the (algebraic) difference of the numbers of periods of the two multiphase currents divided by half the number of the poles of the motor, while consequently the absolute numbers of periods will be only of subordinate significance. The motor will therefore stop and also be kept in its momentary position when both currents have an equal number of periods. It will run in the positive or the negative direction when there is a difference in the numbers of these periods—viz., according to the (algebraic) difference between them.

In order to start the receiver, it is requisite or expedient in the first instance to have equal numbers of periods for the two multiphase currents. If at this moment no other forces act on the motor, its movable part will assume such a position that the opposite poles of the two rotating magnetic fields will face each other. If external forces act on the motor, endeavoring to turn its movable part to the right or left, this feature will be the same in the main, for the movable part will also assume a fixed position; but the opposite poles of the two magnetic fields which were facing turn from each other more or less in proportion to the intensity of the external forces in such manner that the axes of the two magnetic fields form an angle of proportionate size to each other, (angle of distortion.) Now when the numbers of periods of the two multiphase currents are made to be different, so that one of the two rotating fields begins to turn at a higher speed than the other, the rotating fields will yet have to keep their relative position on account of the tangential forces corresponding to the angle of distortion. This, however, can only be done if the movable part of the motor revolves in correspondence to the difference of velocity of the two rotating fields, and it must certainly move in the same direction in which the magnetic rotating field of the fixed part turns if this part is excited by currents of a higher number of periods than the movable part, and it will move in an opposite direction if the fixed part is excited by currents of a lower number of periods than the movable part. Thus the somewhat complicated electric processes can be made plain in a mechanical way. It is of course to be presumed that the external forces acting on the receiver do not exceed certain limits, which are fixed by the power of the engine and other factors.

For the technical execution of the plan it is important to know what different kinds of work appear in the whole system and in what manner these are divided between the two multiphase currents. If we start from the sources of the two multiphase currents and designate work done as "positive" work and work absorbed as "negative" work, the effective work A—$i.\ e.$, the mechanical work of the receiver—may be either negative or positive, according to whether the receiver is driven by the power transmission, and thus absorbs work from the system of power transmission, or whether, on the other hand, it receives work from external sources and transfers it to the system of power transmission. The latter kind of work occurring in the system—viz., the heating effect $a$, caused on account of unavoidable frictions, heat produced by the currents, and change of magnetization—is always negative. The two kinds of electrical work $a'$ and $a^2$, which are performed in the two systems of multiphase currents, may undergo a change of their signs, according to whether the so-called "angle" of difference of phases between current and tension is smaller or larger than ninety degrees. In the former case the respective source of multiphase current supplies work. In the latter case this source of current absorbs work. For the sum of all kinds of work done in the system the law of conservation of energy is in force—$i.\ e.$, it is at every movement—$A - a - a' - a^2 = O$ or $A = a + a' + a^2$. On going into an examination in detail we discover that the two systems of multiphase currents perform exclusively heat work at such time when external forces do not act on the motionless receiver. On the other hand, a transfer of electrical work from one system of current to the other takes place at all other times, even during action of external forces on the idle receiver—viz., when A is still $= O$—and likewise when the receiver moves, whether in an opposite sense to the external forces or in the same sense. This transfer appears at first in the light of a partial taking up of the heat work of one system by the other; but with greater external forces in action it shows as a transfer of work to the former. In this case the more heavily loaded system has not only to impart motion to the receiver without assistance from the other, but also further additional electrical work to transfer upon the second system of multiphase currents. Thus if we ignore the heat work, the algebraic sum of all kinds of work of both systems of currents or by absolute value the difference thereof is absorbed by the receiver, for ignoring the heat work the two kinds of electrical work have always opposite signs except in the case $A = a' = a^2 = O$. The plan herein proposed may therefore be called an "electrical differential gearing" not only on account of incidents of the movement, but also on account of incidents of the work. At the same time the practically important result is gained that with unchanged direction of the external forces one of the systems of multiphase currents is always loaded, while the other is discharged or may, moreover, absorb work—as, for instance, in the case of a double-compartment hoist, where the right bucket continually carries the heavier load and in the case of a steering-gear machine when the rudder moves on the starboard side, whether these movements go against or with the pressure of the water—and that these functions are reversed when the direction of the forces is reversed—viz., when the left bucket of the hoist is loaded or when the rudder acts on the port side.

II. Any proper means may be used to generate the two multiphase currents with relatively variable numbers of periods to be employed for the system described herein. I may have, for instance, a separate steam-engine for each of the multiphase-current generators and change the velocities of these two engines; but as in any case on account of the described mode of action of this system only one of these electrical machines will generate a current, while the other absorbs current, (is driven,) it would be necessary to provide the steam-engines for the latter case with appliances similar to those required for mountain-locomotives when running downhill. The system of power transmission can, however, only compete industrially with other systems if the work transferred from one machine to the other is not wasted by transformation into heat, which waste takes place when a mountain-locomotive runs downhill, but rather when it is utilized by being sent back to the second work-generating machine. In this case the source of energy needs to supply only the difference of both kinds of work, including the work lost in the machine itself. Such equalization of work can be accomplished in a simple way by means of electricity. Therefore in the following two methods will be described by means of which the two multiphase currents with variable numbers of periods can be generated in such a manner that the existing source of electrical energy need only supply the work actually consumed in the system of transmission. I premise in the one case as a source of energy a plant for a continuous current and in the other case a plant for a multiphase current.

These two embodiments of the invention will now be described in connection with the accompanying drawings, in which—

Figure 1 is a diagrammatic view of a system embodying my invention as used with a direct-current source of supply; Fig. 2, a similar view of a modified embodiment of my invention as used with a multiphase source of supply; Fig. 3, a side elevation of a transformer of periods such as is indicated at E, Fig. 2; Fig. 4, a modified form of such a transformer of periods used where the receiver D has both its elements—viz., the rotor and stator—supplied with currents through the transformer; Fig. 5, a detail view of one form of indicator-actuating mechanism employed by me; and Fig. 6, a detail view of one form of mechanism for controlling the receiver D, Fig. 1, from the indicator Z.

(a) In the first case the source of current $+ -$ in Fig. 1 drives two transformers of equal size for transforming continuous current into multiphase current. The figure shows each transformer as consisting of one motor for continuous current $G'$ or $G^2$ with the armatures $A'$ or $A^2$ and the field-windings $N'$ or $N^2$ and a generating-machine for multiphase currents $D'$ or $D^2$; but in a well-known manner the multiphase current may also be taken directly from the continuous-current motor. The mode of action of the entire system would not be materially changed by this modification. On the contrary and particularly, there would be only differences of intensity of magnetization of both parts of the receiver and in the difference of phases between current and tension in the individual parts of the system. The modification of the plan referred to as against Fig. 1 will therefore not be especially mentioned in the following. The detailed description will apply equally to both cases. The continuous-current armatures $A'$ and $A^2$ are connected in parallel and may be started together by the starter S, the resistance of which is in circuit with both of them. The rotary current-generators $D'$ and $D^2$ conduct the multiphase currents by means of wires I and II to both parts of the receiver D. In order to change in relation to each other the numbers of periods of the two multiphase currents—i. e., the numbers of revolutions of the transformers—it will only be necessary to excite in different degrees the two motors which were originally excited for an equal number of revolutions, which may be done by reducing the excitation of the motor that is to run faster and by increasing the excitation to get a slower speed in the other. To accomplish this purpose, the two field-windings (shown at $N'$ and $N^2$ of Fig. 1) are also connected in parallel, and these latter have a common resistance R., which acts as regulator, all connections being so arranged that by turning the switch-crank H, which is constantly connected with one of the poles of the source of constant current, the division of resistance between the windings $N'$ and $N^2$ may be changed. As soon as the speed of one of the transformers—say $G' D'$—is increased in consequence of such a variation the receiver D will turn in a certain direction, that can be determined beforehand, and said receiver D will turn in the opposite direction when the switch-crank is turned over to the other side, causing $G^2 D^2$ to run faster than $G' D'$.

(b) In case of existence of a primary multiphase current the required currents for running the plant can be obtained without any revolving transformers by using a stationary transformer of periods, which will necessitate use of contact-brushes rubbing against a commutator. The design shown in Fig. 2 of generation of current by means of a transformer of periods is the following: The laminated iron core E is provided with coaxial perforations E'. In these perforations a system of windings is placed in such an arrangement as to form an ordinary drum-winding together with the part of the iron core surrounded by the said perforations. I prefer to make this winding multipolar and to subdivide it in such a way that the number of poles distributed on one half of the circumference and the number of phases employed in the multiphase current are not divisible by the same number. Thus in case of a three-phase current the circumference of the drum ought to be subdivided into a number of poles not divisible by three. Moreover, the dimensions of the drum and the winding ought to be so chosen that the conditions of magnetization, weight of iron, &c., are as favorable as possible. In order to make the sketch as simple as possible, the continuous-current winding, being a thing well known, has been omitted, while, on the other hand, the commutator for the continuous-current winding is indicated. The number of segments of this commutator must be as large as possible—as, for instance, in the case of the so-called "wave-winding," where it is best to be equal to the number of divisions in the winding multiplied by half the number of poles. In the sketch, which represents a four-pole winding, only one-half of the wires leading to the commutator are indicated. The commutator-segments without wires are to be connected in the ordinary way with the other segments lying opposite that are already connected.

If the primary existing multiphase current is conducted to suitable places (under conditions described herein they are disposed symmetrically) from the conductors I to the continuous-current winding, a rotating magnetic field will be formed in the stationary body of iron, of which the lines of force can close entirely in the iron, as air-spaces do not exist. Only a weak magnetizing force of current will therefore be required. The number of revolutions made by the rotating magnetic field is equal to the number of periods of the supplied multiphase current divided by one-half the number of the poles of the continuous-current winding. Now if a certain number of contact-brushes $B'$ $B^2$ $B^3$, the number corresponding to that of the phases, is made to rub against the commutator and at the same time against conducting-rings $R'$ $R^2$ $R^3$ this apparatus will act as a transformer of periods when the axle carrying the brushes is in rotation. Thus in the conductors II, which start from the rings $R'$ $R^2$ $R^3$, a multiphase current is obtained the number of periods of which is equal to that of the primary multiphase current reduced or increased by the number of revolutions of the revolving brushes multiplied by half the number of the poles of the continuous-current winding, the decrease or increase depending upon whether the brushes revolve in the same direction as the magnetic field or in the opposite direction. If the primary current I, as well as the secondary current II, is conducted to the receiver, it will revolve in a direct and synchronous manner with the brushes if it has the same number of poles as the continuous-current winding, or otherwise its number of revolutions will be in a fixed ratio to that of the brushes. A practical embodiment of this arrangement is illustrated in Fig. 3, in which E is the stationary iron core inclosing a continuous-current winding of any usual description connected to the commutator C. This commutator also carries a set of slip-rings $R'$, $R^2$, and $R^3$. Opposite the commutator is placed a bearing M, containing the shaft of the brush-holder K. The three brushes $B'$, $B^2$, and $B^3$ contact with this commutator, as indicated diagrammatically in Fig. 2, and three other brushes are also provided which slide on the rings $R'$, $R^2$, and $R^3$. The whole system of brushes can be rotated by hand by means of the handle L or, if it is preferred, by the pulley P.

Instead of transmitting the primary current directly to the receiver and varying the periodicity of the secondary current by rotating the brushes it is also possible to obtain a similar result by providing two rotating systems of brushes, as illustrated in Fig. 4. In this modification the winding of the transformer E is connected to two separate commutators C and C'. Correspondingly two sets of brushes $B'$ $B^2$ $B^3$ and $B'^1$ $B'^2$ $B'^3$ are provided, and each set can be rotated independently of the other. In this case the speed of the receiver D will correspond to the algebraic difference of the numbers of revolutions made by the two sets of brushes in the unit of time.

It will be readily understood from the foregoing explanation that in the arrangement shown in Fig. 3 the action does not depend upon the absolute velocity of the brushes, but rather upon the relation between the velocity of the brushes and that of the iron core E. From this would follow that if it be preferred to work with stationary brushes the same result would be obtained by correspondingly rotating the core. In all cases when carrying out the plan described due regard must be paid to the fact that the receiver D on account of its inertia and of the work it has to perform cannot suddenly assume any degree of velocity corresponding to the revolutions of the brushes. For this reason an excessive acceleration of speed, as well as too sudden stoppage of the revolving brushes—viz., of the entire transformer—must be prevented by proper means. If the transformer is made to revolve instead of the brushes, this desirable object will be attained more or less by means of the moment of inertia of the transformer-body, as in the arrangement shown in Fig. 1 the moments of inertia of the revolving parts of the two continuous-current multiphase transformers prevent too rapid changes of their speeds.

(c) Practically the difference in the two systems of working the sender, as described above, sub $a$ and $b$, is the following: If the two multiphase currents are generated with the assistance of a transformer of periods, the receiver will stop as soon as the sender is stopped, no matter whether external forces (within limits prescribed by the size of the machine) exert an action on it or not. In this respect the receiver without exception (within the above-named limits) follows instantaneously the movements of the sender; but if the two multiphase currents are generated by transformers transforming continuous currents into multiphase currents the receiver with equal excitation of both transformers, the switch-crank H being in the center position, Fig. 1, will only then come to a stop when external forces do not influence it. If the receiver is under the influence of such forces, in order to stop it the position of the switch-crank must necessarily deviate to one side or the other from the middle position, and this deviation (the required angle of support) will increase in proportion to the strength of the external forces. As already explained, a transfer of work from one of the two systems of multiphase currents to the other is effected in this case, and the two active continuous-current motors must be unequally loaded. With equal number of revolutions and equal tension in the armatures this can only be made possible by exciting both motors in different degrees. There will be a certain natural relation between the angle of support of the switch-crank and the angle of distortion of the rotating magnetic fields of the receiver, for both are dependent on the intensity of the external forces acting on the receiver. If the angle of support of the switch-crank is too small, the receiver will give way, even though very slowly, to the external forces. If the angle is too large, the receiver will gain on the external forces with more or less speed. Besides, with this method of driving the position or the movement of the receiver is not instantly affected by the position of the switch-crank. The receiver, on the contrary, will only gradually assume the conditions prescribed by the position of the switch-crank. In this case, therefore, much similarly to opening a valve, the effect desired for the time must always be awaited, while with the other method cause and effect, except for a very slight interval, are simultaneous.

III. In many plants arranged according to the method described there may be need to control exactly at the sender's point the movements of the receiver or to have right before the eye a movement exactly synchronous with the same. This may be done in two ways. One, which can be employed with any desired method of generating current, consists in this, that by means of the same two multiphase currents that are conducted to the receiver a very small motor Z (index-motor) is run at the transmitting-station, which thus indicates the position of the receiver. A second method would consist in mechanically coupling the transmitter. The first way is shown in Figs. 1 and 2. The motor Z has only to work the mechanism of the indicator, the construction of which must correspond with conditions and circumstances as each case may require. The sketches, for example, show an arrangement that is particularly suitable for handling a rudder from a distance. The index-motor in these may have as many poles and run as fast as may be desired, and it carries on its axle the small index-hand on the center of the dial, (index of motion,) while the large index-hand (rudder-index) is moved by means of gearing driven from the revolving axle. When it is desired to have the rudder stationary, the index of motion will indicate with great exactness whether the index-motor, and with it the receiver, as well as the rudder, are in reality at a standstill or whether it moves a little in one direction or the other. The rudder-index shows constantly and plainly the size of the angle assumed by the rudder at any time. The gearing for the rudder-index to accomplish this must be so proportioned that starting from a correct initial the rudder-index will any moment form an angle with its middle position on the dial, which is the same as the angle of the rudder with the longitudinal axis of the vessel. A position of the rudder to the left must of course be indicated by movements of the rudder-index to the left or to the right, or vice versa, as one may select to have it, and the connection of the index-motor, as well as the transfer of motion from the index of motion to the rudder-index, must be designed to this end. The angular position of the rudder-index and that of the rudder cannot certainly be exactly identical, as the angles of shifting of the magnetic fields of the receiver and of the index-motor may differ entirely as to size; but as in practice the ratio of speed of the receiver to that of the rudder on the one side and of the index-motor to that of the rudder-index on the other side is very large this trifling inaccuracy is really of no consequence whatever. The combination of the rudder-index and the index of motion will, on the contrary, give the closest control imaginable of the largest as well as the smallest motions of the rudder just as on the dial of a watch the greater movements are indicated by the hour and minute hands, while the smaller movements or stoppage of the watch are shown to the eye by the hand for the seconds. A tachometer connected with the index-motor can eventually also show at any moment the speed of the receiver. In the second instance mentioned above the mode of coupling the index mechanism with the transmitter will depend upon the choice of means for generating the transmitting-currents. If, for instance, the method shown in Fig. 1 is used, the two converters $D'$ $D^2$ may be connected by a differential gear, such as illustrated in Fig. 5, the differential gear being arranged to operate the index. In this arrangement the two converters are mounted in such a way that their shafts are in line with each other, and on each shaft is fixed a bevel gear-wheel, as indicated at $T'$ $T^2$, Fig. 5. A casing $S^5$ is revolubly mounted on the said shafts of the converters $D'$ $D^2$, and within said casing is fixed a shaft $S'$ transverse to the two converter-shafts. On the shaft $S'$ are journaled two bevel gear-wheels $S^3$ in mesh with the bevel gear-wheels $T'$ $T^2$. To the casing $S^5$ is fixed a sprocket-wheel $S^4$, which is connected by a chain to a similar sprocket-wheel fixed on an index-shaft $Z'$, carrying an index or pointer $Z^2$, as will be clear from Fig. 5. When the shafts of the converters $D'$ $D^2$ are rotating in synchronism in opposite directions, the casing $S^5$ and the sprocket-wheel $S^4$ will not rotate in either direction. At this time the pointer $Z^2$ will remain at rest. When one converter is rotating slowly in one direction while the other converter is rotating rapidly in the opposite direction, the casing $S^5$ and the sprocket-wheel $S^4$ will rotate in the same direction as that of the rotation of the faster converter and with a speed equal to half the difference in number of revolutions of the two converters. Hence the number of revolutions of the pointer $Z^2$ is always proportional to the difference in speed of the two converters and in the direction of the faster of the two. Therefore said pointer always moves in the direction of rotation of the rotating part of the receiver D, Fig. 1, with a speed proportional to that of said rotating part. On the other hand, in the method of generating current shown in Fig. 2 the movement of the revolving part of the sender (eventually with due consideration of the constant factor determined by the number of poles) corresponds directly to the movement of the receiver, and may therefore be used to drive direct the index mechanism. In the same way if the two multiphase currents were derived from sets of brushes rotating in an opposite direction the sum of their rotations would be equal to the rotation of the receiver less one constant factor. Consequently the rotation of one set of brushes would stand in constant relation to the latter and might be used to drive direct the index mechanism.

The indicator Z, Fig. 1, instead of being employed merely to indicate the position of the receiver D, may also be employed to control it. For this purpose I may arrange the pointer $Z^6$ of said indicator Z to control the action of suitable mechanism which will move the regulator-arm H, Fig. 1. An example of such an arrangement is shown in Fig. 6, in which V is a shaft kept in rotation by any suitable means. (Not shown.) On this shaft are loosely mounted two bevel gear-wheels $V'$ and $V^2$, which are both in mesh with a bevel gear-wheel W, to whose shaft is fixed the regulator-arm H of the regulator R, Fig. 1. To the shaft V, Fig. 6, is splined a sleeve $V^3$, longitudinally movable with relation to the shaft and provided at its opposite ends with friction-cones $V^4$, arranged to engage conical recesses in the respective gear-wheels $V'$ $V^2$. The sleeve $V^3$ is provided with a circumferential groove into which enters a pin in the end of the pointer $Z^6$, Figs. 1 and 6. When said pointer $Z^6$ is in its intermediate position, the sleeve $V^3$ will be in an intermediate position and both its friction-cones will be out of engagement with both gear-wheels $V'$ $V^2$. When, however, the pointer $Z^6$ is moved to one side or the other, it will shift the sleeve $V^3$ in the same direction, and thereby bring the corresponding friction-cone into engagement with the respective gear-wheel $V'$ $V^2$, thus causing the gear-wheel W and the arm H to be rotated in one direction or the other, according to the position of the pointer Z. It will be noted that the connection between the pointer $Z^6$ and the regulator-arm H is a frictional one. Therefore the regulator-arm may be manually adjusted at any time. Assume now that the rudder is in the position indicated by the pointer $Z^6$, Figs. 1 and 6—viz., to port—and that it is desired to move it to the other side—viz., to starboard. The regulator-arm H is moved manually in the desired direction to operate the receiver D, whereby the motor of the indicator Z, Fig. 1, and pointer $Z^6$ are also operated, the pointer at once moving toward the left, Figs. 1 and 6, and thus releasing the right-hand friction-cone $V^4$ from the gear-wheel $V'$. If the regulating-arm be moved back to its central position in the rheostat R, the receiver D and the indicator Z will be stopped. Hence manually the rudder and the pointer $Z^6$ may be stopped at any desired position intermediate the extreme positions. If, however, the regulator-arm H be not manually returned to its intermediate position on the rheostat R, the receiver D, with the rudder, and the indicator Z, with its pointer $Z^6$, will continue to move until the pointer $Z^6$ reaches its extreme position to the left, whereupon the left-hand friction-cone $V^4$ will be brought into frictional engagement with the gear-wheel $V^2$ and the latter thereby locked to the rotating shaft V, thus causing the rotation of said gear-wheel $V^2$, which, in turn, rotates the gear-wheel W, and thereby moves the arm H backward. So soon as this arm comes into its intermediate position the receiver D and the indicator Z are stopped. In this way the automatic stopping of the receiver D and the rudder at the extreme positions is insured.

Of course in all cases in order to obtain a further control and, still better, safety a second returning report to be made directly by the receiver or by the rudder can be arranged for by any well-known method independently of the multiphase-current transmission.

IV. Finally an important feature must be noticed, which is that in the system under consideration and with the arrangements as described it is not necessary to have the same numbers of phases for the two multiphase currents. On the contrary, these numbers may be different for both currents without any consequence of consideration as to the proceedings and results.

Having thus fully described my invention, what I claim as new, and desire to secure by Letters Patent of the United States, is—

1. The combination, with two sources of alternating current, the periodicities of the currents from each source being adjustable with relation to the periodicity of the current from the other source, of a rotor supplied with current from one source, and a stator supplied with current from the other source.

2. The combination, with a rotor and stator, of means for supplying an alternating current to the stator, and means for supplying alternating current to the rotor, said supplying means being each adjustable so as to permit the ratio of the periodicities of the alternating currents to be varied from zero to infinity.

3. The combination, with a pair of devices arranged to supply alternating currents, said devices being adjustable to vary the ratio of the periodicities of their respective currents from zero to infinity, of a rotor supplied with alternating current from one of said devices, and a stator supplied with alternating current from the other device.

4. The combination, with a rotor and a stator, of means for supplying multiphase currents to said rotor and stator whereby a rotary magnetic field is established in each, and means for increasing and diminishing the periodicity of either of the said multiphase currents in relation to the other.

5. The combination, with a rotor and a stator, of means for producing a rotary field in each, and means for varying the ratio of the angular velocities of said rotary fields from zero to infinity.

6. The combination, with a pair of rotary transformers and means for supplying current thereto, of mechanism for varying the relative speeds of the transformers, a rotor supplied with alternating current from one transformer, and a stator supplied with current from the other transformer.

7. The combination, with a pair of rotary transformers and means for supplying current thereto, of field-control mechanism for varying the relative speeds of the transformers, a rotor supplied with alternating current from one transformer, and a stator supplied with alternating current from the other transformer.

8. The combination, with two sources of alternating current, of means for varying the speed of each relative to that of the other, a rotor supplied with current from one source, and a stator supplied with current from the other source.

9. The combination, with a pair of rotary transformers, transforming from direct current to multiphase alternating current, of means for supplying direct current to said transformers, a rotor supplied with multiphase current from one transformer, and a stator supplied with multiphase current from the other transformer.

10. The combination, with a source of continuous current, of two transformers arranged to transform said continuous current into two sets of multiphase currents, a rotor connected to one of said transformers, a stator connected to the other transformer, and means for varying the ratio of the periodicities of the multiphase currents produced by the two transformers.

11. The combination, with a rotor and a stator, of means for supplying multiphase currents to said rotor and stator whereby a rotary magnetic field is established in each, means for varying the ratio of the periodicities of the said multiphase currents, and an index mechanism arranged to indicate the movement of said rotor.

In tesitmony whereof I affix my signature in presence of two witnesses.

ADOLF EMIL WALDEMAR MEISSNER.

Witnesses:
 WOLDEMAR HAUPT,
 HENRY HASPER.